US011318512B2

(12) United States Patent
Seidel et al.

(10) Patent No.: US 11,318,512 B2
(45) Date of Patent: May 3, 2022

(54) THERMAL INSULATION DEVICE (71) Applicant: SMS Group GmbH, Duesseldorf (DE)

(72) Inventors: Juergen Seidel, Kreuztal (DE); Denis Anders, Netphen (DE)

(73) Assignee: SMS GROUP GMBH, Duesseldorf (DE)

( * ) Notice: Subject to any disclaimer, the term of this patent is extended or adjusted under 35 U.S.C. 154(b) by 297 days.

(21) Appl. No.: 15/742,915

(22) PCT Filed: Jul. 1, 2016

(86) PCT No.: PCT/EP2016/065608
§ 371 (c)(1),
(2) Date: Jan. 9, 2018

(87) PCT Pub. No.: WO2017/009074
PCT Pub. Date: Jan. 19, 2017

(65) Prior Publication Data
US 2018/0214920 A1    Aug. 2, 2018

(30) Foreign Application Priority Data

Jul. 10, 2015  (DE) .......................... 102015212976.4

(51) Int. Cl.
*B21B 45/00* (2006.01)
*B21B 37/74* (2006.01)

(52) U.S. Cl.
CPC ............ *B21B 45/008* (2013.01); *B21B 37/74* (2013.01); *Y02P 70/10* (2015.11)

(58) Field of Classification Search
CPC ..... B21B 15/005; B21B 37/74; B21B 45/008; B21B 45/004; Y02P 70/127;
(Continued)

(56) References Cited

U.S. PATENT DOCUMENTS 2,182,201 A * 12/1939 Harris .................. C21D 9/0025
266/262
3,080,087 A * 3/1963 Cloyd .................... B65D 1/243
220/324
(Continued)

FOREIGN PATENT DOCUMENTS

EP           59093       9/1982
EP          248674      12/1987
(Continued)

OTHER PUBLICATIONS

Translation of KR-20130120700-A: Kim et al, Translated Jun. 6, 2020 (Year: 2012).*
(Continued)

*Primary Examiner* — Teresa M Ekiert
*Assistant Examiner* — Sarkis A Aktavoukian
(74) *Attorney, Agent, or Firm* — Abelman, Frayne & Schwab; Stefan Knirr (57) ABSTRACT

The invention relates to a thermal insulation device (1) for thermal insulation of a metal product in a rolling mill, comprising a support element (2), on which a number of thermal insulation elements (3) is arranged. To extend the service life of such a device, the invention makes provision that at least one thermal insulation device (3) is formed by multiple side parts (4, 5, 6, 7, 8, 9), which enclose within them an accommodating space for a thermal insulation material, wherein at least two of the side parts (4, 5, 6, 7, 8, 9) are connected with each other at their adjoining side areas by a hinge-like connection (10).

27 Claims, 7 Drawing Sheets

(58) Field of Classification Search
CPC ....... F27D 1/0023; F27D 1/026; B65D 81/38;
B65D 81/3813; C21D 9/54; C21D 9/56;
F27B 9/28; F27B 13/10
USPC ........ 432/258, 251, 153; 266/262, 285, 282,
266/286; 220/810, 826, 692, 592.24,
220/292.25, 592.09, 592.1; 206/591, 521
See application file for complete search history.

(56) References Cited

U.S. PATENT DOCUMENTS

| | | | | |
|---|---|---|---|---|
| 3,962,750 | A | * | 6/1976 | Buss .................... E05D 3/02 16/381 |
| 4,524,702 | A | | 6/1985 | Miller |
| 4,595,358 | A | | 6/1986 | Ginzburg |
| 4,719,779 | A | * | 1/1988 | Laws .................... B21B 45/008 72/12.5 |
| 4,811,588 | A | * | 3/1989 | Watson ................. B21B 45/008 72/202 |
| 5,033,926 | A | * | 7/1991 | Laws .................... C21D 9/0006 414/154 |
| 5,101,652 | A | | 4/1992 | Burk |
| 5,709,409 | A | * | 1/1998 | Engel .................... B42D 3/02 281/29 |
| 8,066,143 | B2 | * | 11/2011 | Baltz .................... B65D 21/064 220/324 |
| 9,694,405 | B2 | | 7/2017 | Seidel |
| 2003/0180677 | A1 | * | 9/2003 | Akiyama ........... B23K 37/0443 432/251 |

FOREIGN PATENT DOCUMENTS

| | | | | | |
|---|---|---|---|---|---|
| FR | 2630533 | A1 | * | 10/1989 | ........... F27D 1/0033 |
| GB | 659218 | A | * | 10/1951 | ............... B65D 9/16 |
| JP | 61180608 | | | 8/1986 | |
| JP | 02147113 | | | 6/1990 | |
| KR | 20130120700 | A | * | 11/2013 | |
| RU | 2487769 | | | 7/2013 | |
| WO | WO-9014295 | A1 | * | 11/1990 | ............. B65D 81/38 |
| WO | 2010077177 | | | 7/2010 | |

OTHER PUBLICATIONS

Deltana—S35R5HD Specifications—https://www.doorware.com/specials/pdf/deltana/DEL-S35R5HD-specifications.pdf (Year: 2013).*
Translation of JPH02147113: Mori et al, translated Feb. 6, 2020 (Year: 1988).*
Alema—HBFN-SZ—Bi Folding Door Mechanism—https://www.alema.com/hbfn-sz-horizontal-bi-folding-door-mechanism.html (Year: 2010).*
Ginzburg, V. et al., Heat Conservation between Roughing and Ginishing Trains of Hot Strip Mills, Iron and Steel Engineer, Apr. 1986, pp. 29-39.
Khloponin, V. et al., The Application of Heat Conservation Shields for Hot Strip Mills, Steel Times International, May 2001, pp. 22-25.
Heat Saving Plant (HSP) with heat accumulating cassettes, JSTOK ML Ltd., Aug. 2011.

* cited by examiner

THERMAL INSULATION DEVICE

RELATED APPLICATIONS

This application is a National Stage application of International Application PCT/EP2016/065608 filed on Jul. 1, 2016 and claiming priority of German Application DE 10 2015 212976.4 filed on Jul. 10, 2015, both applications are incorporated herein by reference thereto.

The invention relates to a thermal insulation device for thermal insulation of a metal product in a rolling mill and which has a support element on which a number of thermal insulation elements are arranged.

Thermal insulation devices of this kind are known in the prior art. In practice, thermal insulation covers for reducing temperature losses of hot strips or slabs have long been known. EP 0 468 716 A2, for example, shows how an insulating cover unit in the area of a rolling path of a hot strip rolling mill is designed. On the warm side of the cover, here ceramic fibers are arranged. EP 0 059 093 B1 discloses thermal cover types consisting of a core of thermally insulating material (ceramic fibers) and a thin wall applied externally on the warm side, which forms a metallic membrane made of a heat-resistant material. A similar structure in principle is disclosed by U.S. Pat. No. 4,595,358 A, but here with a specially shaped insulating material as well as membrane plates. EP 0 248 674 A1 discloses a thermal insulation cover consisting of multiple insulating material layers. Additional solutions are disclosed by DE 10 2013 219 507 A1, RU 2 487 769, U.S. Pat. No. 5,101,652, WO 2010/077177 A1, and U.S. Pat. No. 4,524,702.

The durability of membrane plates of thermal insulation covers is limited. This has to do in part with high thermal stresses, for example, due to mechanical forces that act on the membrane plates when suspended in unfavorable fashion or when the membrane plates units are too large.

Additionally, the insulation cover units or the membrane plates for the most part are designed to be identical in an installation. Adaptation for example, over the width of the installation and/or to the varied temperature differences in the various areas is not taken into account in the prior art. Also, no adaptation of the membrane plate thickness to the temperature level and/or to the duration of thermal loading of the insulation cover membranes occurs within an installation.

Due to the non-optimal design, in the prior art, maintenance expenses are high for insulation cover units thus designed.

The object of the invention is to further develop a generic thermal insulation device so as to extend the service life of the device. Additionally, maintenance and repair expenses should be minimized. Lastly, an optimal adaptation of thermal insulation elements to the particulars of an individual application should be easily possible.

This object is achieved by the invention that is characterized in that at least one thermal insulation element is formed by multiple side parts, which enclose an accommodation space for a thermal insulating material within them, wherein at least two of the side parts are connected with each other at their adjoining side areas by a hinge-like connection.

The hinge-like connection can be formed by a number of hinges, which are arranged along the adjoining side areas. In this case, preferably provision is made that a hinge partial length at most is 10 times greater than the hinge diameter.

The hinge-like connection can also be formed by at least one spiral-shaped wire which is threaded into boreholes that are inserted along the adjoining side areas.

One alternative embodiment makes provision that the hinge-like connection is formed by an at least sectional weakening of the mechanical strength, especially the flexural strength of at least one side part. The said weakening can be produced by at least one recess in the side part. The weakening can also be produced by assembling the side part from at least two separate side part sections connected with each other.

Accordingly, the hinge-like effect can be generated by deliberate weakening especially of the longitudinal side plates by creation of recesses, by insertion of a thinner intermediate plate, or by a connection of the plates subject to play, or also through a combination of the above-mentioned measures.

Finally, the hinge-like connection can be formed according to an additional alternative through sections of the side areas and recesses in the side areas, wherein deformed sections in recesses are inserted in the area of the adjoining side areas.

The side parts preferably are formed by metal plates.

The thermal insulation material preferably is at least partially formed by ceramic fibers.

A number of thermal insulation elements can also be arranged both in a direction transverse to the feed direction of the metallic product and also in the feed direction of the metallic product.

Preferably at least one thermal insulation element—viewed in the feed direction of the metallic product—has a square, rectangular or trapezoidal shape.

Further provision can be made that multiple thermal insulation elements are arranged next to each other, transverse to the feed direction of the metallic product, wherein at least two adjoining thermal insulation elements have a joint side part.

Additionally, multiple thermal insulation elements, arranged in a direction transverse to the feed direction of the metallic product, are penetrated by a rod. Preferably with this, the rod penetrates lateral sections of the support element that extends in a vertical direction and here is attached by attachment elements, for example screws.

Further, provision can be made that a vertical gap be present between the thermal insulation elements and the support element, which preferably is at most 30 mm wide. The gap also can at least partially be filled with insulating wool, for example with biocompatible ceramic fibers. With arrangement of the insulating wool in the gap, the extension of the gap in the vertical direction preferably is at most 100 mm.

The gap can also be penetrated in the vertical direction by a number of spacer bolts, which are attached to the support element and to the thermal insulation element.

The thickness of the side part plates can additionally differ at least in part, especially with the side parts extending in the feed direction being thicker than that side parts which extend perpendicular to the feed direction (thus the front sides of the thermal insulation elements).

The thermal insulation elements can at least in part be designed to differ in width in the transverse direction.

Additionally, it is possible that in the feed direction, at least two thermal insulation elements can be arranged to follow one another, wherein the two thermal insulation elements following one another in the feed direction have corresponding side parts which are designed to differ in thickness.

Accordingly, provision can be made that a thermal insulating element can be used with different thicknesses of metal plates, especially for the hot-side plates, in comparison with the longitudinal and head-side plates, especially and preferably with the longitudinal and head-side plates being designed to be thinner. Over the installation length in the feed direction, accordingly depending on the expected maximum membrane plate temperature, the insulating elements can be designed with different metal plate thicknesses, especially on the hot side.

Preferably the insulating elements can be so designed that the upper and lower sides of an element can be arranged according to choice on the hot side, which includes the possibility for an appropriate turning.

Additionally, provision can be made that within an installation, in the feed direction, insulating elements can be combined with metal plate paneling, insulating elements without metal plate paneling (i.e., with ceramic fibers on the hot side), and/or insulating elements designed as specular reflectors.

The invention thus is geared to the use of flexibly movable connections of adjoining plates (metallic membranes) of the thermal insulating element, through which thermal stresses can be substantially reduced.

The proposed solution preferably is used with hot strip rolling mills, where the described device is configured after the manner of a thermal insulation cover.

The proposed configuration achieves improved thermal insulation of the thermal insulating cover, and an extension of the device service life.

Accordingly the service life especially of the used plates (metallic membranes) is increased, and thus the maintenance of the insulating covers is less intense.

The thermal stresses in the membrane plates and in the side plates of the thermal insulation elements can be reduced by the proposed design, whereby the useful life of the plates increases. By this means, the insulating effect can be optimized and the useful life increased by a suitable selection of membrane plate thickness and thermal element width.

Thus, an attachment that swings or has free translational motion and turning, of metallic membranes (side parts) to the upper side (hot side) and to the side surfaces of a thermal insulation element is possible. This swinging, mobile attachment to the side part edges occurs through use of a hinge-like connection, which makes possible a flexible, mobile connection of two adjoining plates.

It is also advantageous if the thermal insulation elements can be used while turning (i.e., their upper side able to be flipped), i.e., the particular surface sides can function as the hot sides as desired.

Advantageously, thermal insulation elements of different widths can be employed over the width of the thermal insulation device.

Additionally, it is possible to adapt to the surface temperature level of the metallic membrane or the strip temperature and the corresponding heating duration by appropriate design of the thermal insulation elements.

Particularly, insulation covers with a thin membrane plate and/or insulation covers without a membrane plate and/or specular membrane covers with insulation covers having thicker membrane plates can be combined within an installation.

The drawings show embodiments of the invention.

Figure 1:
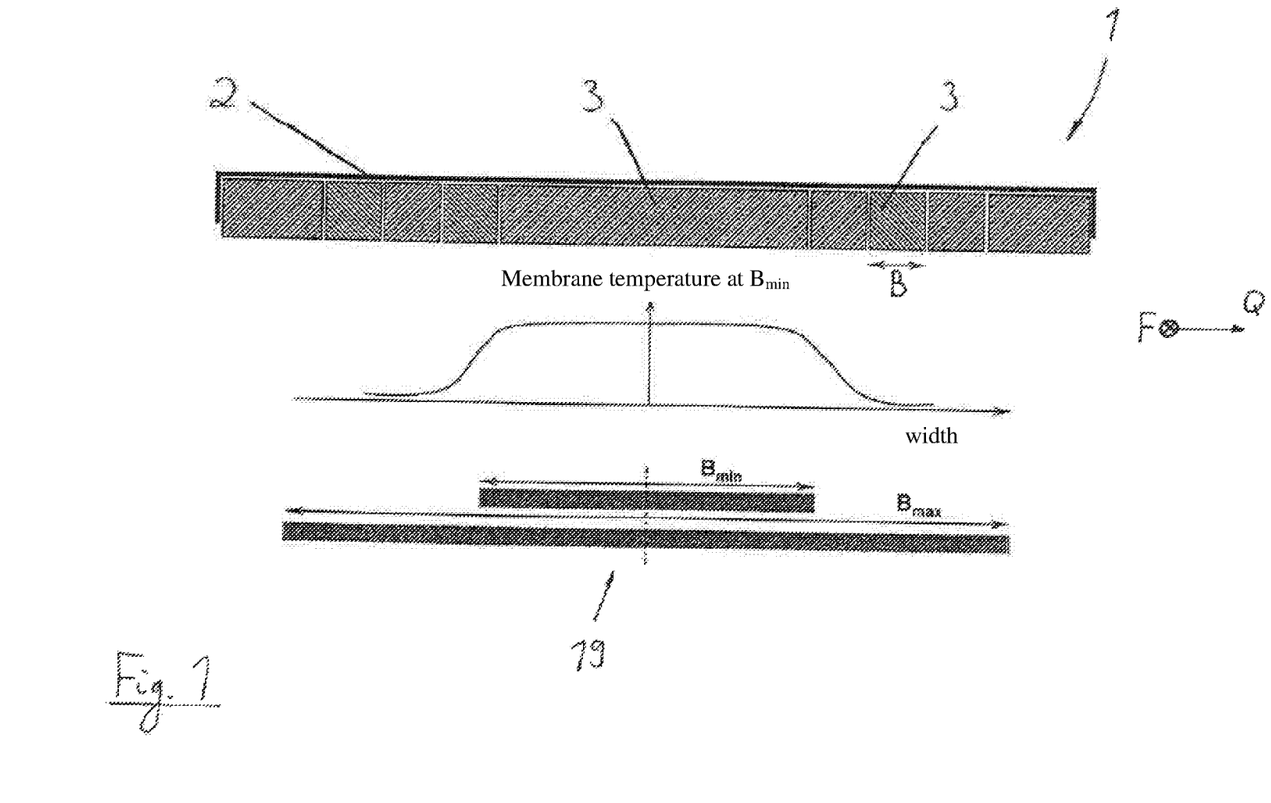
FIG. 1: a schematic view of a thermal insulation device, viewed in the feed direction of the metallic product to be thermally screened, wherein two slabs are shown beneath the thermal insulation device.

In FIG. 1, a thermal insulation device 1 is seen, which has a support element 2 on which a number of thermal insulation elements 3 are arranged. The width of a thermal insulation element 3 is indicated by B, and in fact in a horizontal direction Q transverse to the feed direction F of the belt to be fed or of the slab 19 to be fed. Maximum and minimum values for the slab or belt to be thermally insulated are indicated by $B_{min}$ and $B_{max}$.

The width of thermal insulation element 3 transverse to the transport direction (feed direction F) determines the temperature difference within the element and thus the level of thermal stresses in the membrane plate (what is to be understood by this is the side plate of thermal insulation element 3 facing the belt or slab, see below). Therefore, as narrow an element width as possible is to be preferred. On the other hand, many small thermal insulation units are more expensive to manufacture. Therefore, preferably only narrow elements are used there where it makes sense in order to increase service life. This is in the range from about 90% of the minimum up to the maximum belt width, i.e. the range in which the belt edges are to be expected. Areas in the middle of the rolling path, below the minimum width of the slab or of the belt as well as possible areas outside the edge can be designed to be wider.

The minimum thermal insulation element width in the belt edge areas is dependent on the interval between belt or slab and the metallic membrane of the thermal insulation elements and the expected maximum temperature level of the cover or of the belt or slab temperature and loading time and is determined when configuring the thermal cover section.

The closer, for example, the cover is positioned in front of the belt or the slab, the steeper the temperature transition is, and therefore the narrower the element is to be designed. A minimal thermal element width of less than 200 mm is to be preferred. Such an optimized thermal cover arrangement over the width is therefore advantageous.

As is seen in FIG. 1, in the middle of thermal insulation device 1, a relatively wide thermal insulation element 3 is used, while toward the sides, reduced widths of the insulation elements are provided. The nearer, for example, thermal insulation device 1 is positioned in front of slab 19, the steeper the temperature transition and the narrower the thermal insulation element 3 is to be designed. This is seen from FIG. 1 from the course of the membrane temperature in the image center, which is recorded over direction Q, and in particular in the case of a slab 19 with a minimum width $B_{min}$.

At the bottom in FIG. 1, the minimum and maximum widths of the slab or plate 19 are shown, which are processed in the present installation.

Figure 2:
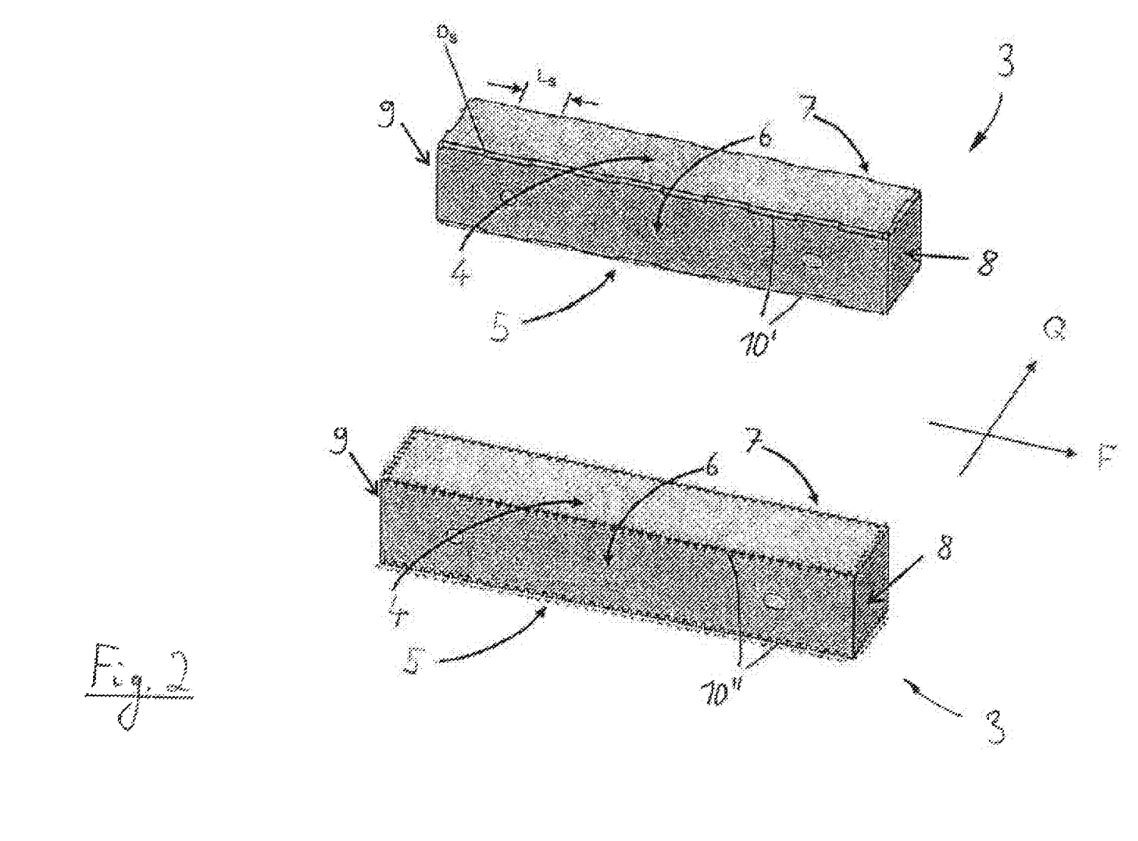
FIG. 2: a perspective view of two embodiments of a thermal insulation element of the thermal insulation device.

In FIG. 2, embodiments of narrow cuboid thermal insulation elements 3 are seen, which are placed on support element 2.

As is perceived, thermal insulation element 3 is formed by multiple side parts 4, 5, 6, 7, 8, 9, which enclose within them an accommodating space for a thermal insulation material (the front plates 8 and 9 are not mandatory), wherein at least two of the side parts 4, 5, 6, 7 are connected with each other by a hinge-like connection 10 on their adjoining side areas.

In a thermal insulation device 1, a plurality of these thermal insulation elements 3 are arranged next to each other and behind each other. Thermal insulation element 3 can have a square, rectangular or also trapezoidal cross section as seen in feed direction F, as well as be designed with sloping geometry or the like. Additionally, provision is made in advantageous fashion that thermal insulation elements 3 are installed so as to turn, i.e. side parts 4 or 5 can as desired be turned toward the hot side or function as the hot side. By this means, the flexibility and the utilization factor of an element 3 increases, i.e. after the one side fails (for example due to damage), following turning, it can be used for twice as long, until it is ultimately replaced.

Along with the width of insulation element 3 mentioned in connection with FIG. 1, suspension or attachment of the membrane (i.e. of the side parts) onto support element 2 in a manner as free of force as possible is important for the service life of the overall device. Especially advantageous is a swinging or flexible attachment of the membrane on the hot side as well as the longitudinal side surfaces (side part 6 and 7). The hot side (side part 5, and after turning of element 3, side part 4) can expand freely and the longitudinal side surfaces (side part 6 and 7) can swing freely in a preset range and carry the hot side. The swinging or flexible attachment is implemented through the above-mentioned hinge-like connection 10.

In the two embodiments seen in FIG. 2, in the upper case, the hinges 10' are used, and in the lower case, spiral-shaped wires 10". Further alternatives are, for example, a plate recess, deformed and inserted into one another, in an adjoining plate or a similarly acting turning connection, which makes possible a flexible, mobile connection of two adjoining plates.

To cause less hindrance to stretching of the side parts (membrane plates), on the hot side, provision is made alternatively for a different, preferably smaller thickness of membrane plate for the longitudinal and head-side plates (side part 6, 7, 8, 9) as compared to side parts 4 and 5.

For reasons of thermal stresses preferably the hinge part lengths $L_S$ are designed to be relatively short (see FIG. 2 top). A hinge part length $L_S$ should not exceed ten times the hinge diameter $D_S$. Preferably the hinge diameter is chosen to be smaller than 10 mm.

Side parts 8 and 9 of a thermal insulation element 3 are head sides, the side edges of which have no connections to the guiding side surfaces, so as not to interfere with the possibility of these surfaces to swing. Additionally, the play in the hinge on the head sides is selected to be greater than on the other sides (upper, lower and longitudinal side), to make allowance for the different amount of swing of the various sides.

Figure 3:
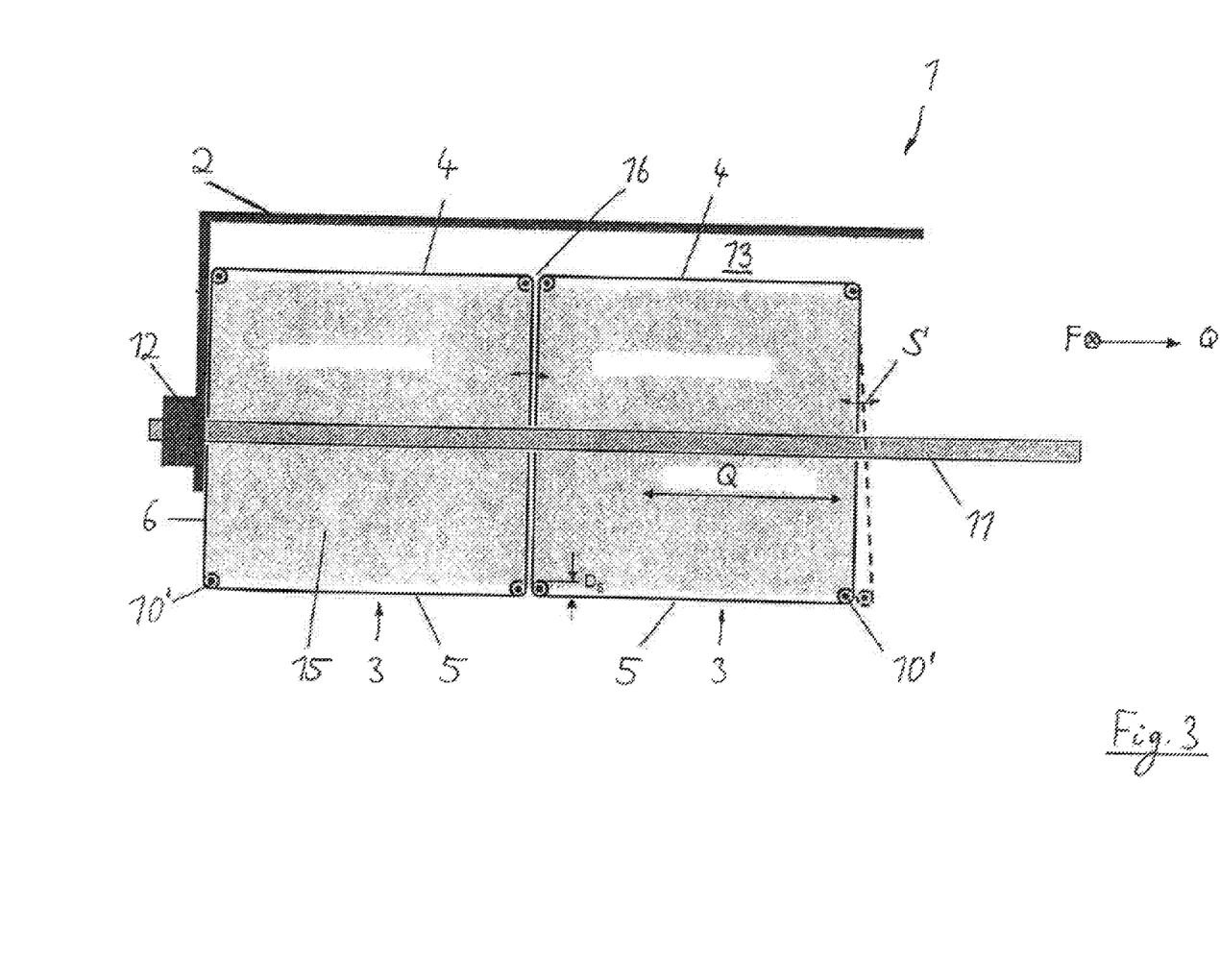
FIG. 3: a schematic view of the thermal insulation device with two thermal insulation elements, viewed in the feed direction of the metallic product to be thermally screened.

FIG. 3 shows an embodiment in which thermal insulation device 1 is shown with two thermal insulation elements 3. The two thermal insulation elements 3 are insulating boxes, which are seen in section perpendicular to feed direction F. Here the thermal insulation elements 3 are secured onto the carrier structure, i.e. on support element 2, via at least one rod 11, which are attached by attachment elements in the form of screws 12 onto support element 2 on the outside; support element 2 here is designed to be U-shaped in cross-section perpendicular to feed direction F. The membrane plates (side parts) here are provided with hinge-like connections 10' on all four sides, to ensure free expansion and an option of the side surfaces to swing. The said swinging or pivoting motion is indicated in FIG. 3 by S. The expansion option of membrane plate 5 is indicated. Accordingly, a high-temperature-stable straight wire as the core of hinge 10' forms the confining component of the individual side parts 4, 5, 6, 7. The diameter $D_S$ of the hinge is understood to be the outer diameter of the bent hinge plate.

Sufficient play allows a motion in the hinge in all directions. A stretch joint 16 in direction Q is provided between two thermal insulation elements 3.

If a side part (side part 5) facing the slab or the plate should become damaged, then through turning of thermal insulation element 3, during maintenance down time, the opposite side part 4 can be turned to the hot side. A possible deformation of the membrane on the formerly used side takes place in the turned state in gap 13 between thermal insulation element 3 and support element 2. Preferably, this gap 13 is between 0 and 30 mm. Alternately, the gap can also be filled with soft, easily deformed insulating wool. The insulation material 15 (ceramic fibers) within the box, i.e., within thermal insulating element 3, is so arranged that an unnecessary disturbing pressure loading on the hot-side membrane is avoided, as seen in FIG. 3. In an advantageous fashion, the ceramic fibers are braced in the area of hinges 10', of spiral-shaped wired 10" (not shown in FIG. 3) and/or of rod 11. If required, the ceramic insulation fibers in thermal insulation element 3 can consist of various materials with different strength.

Figure 4:
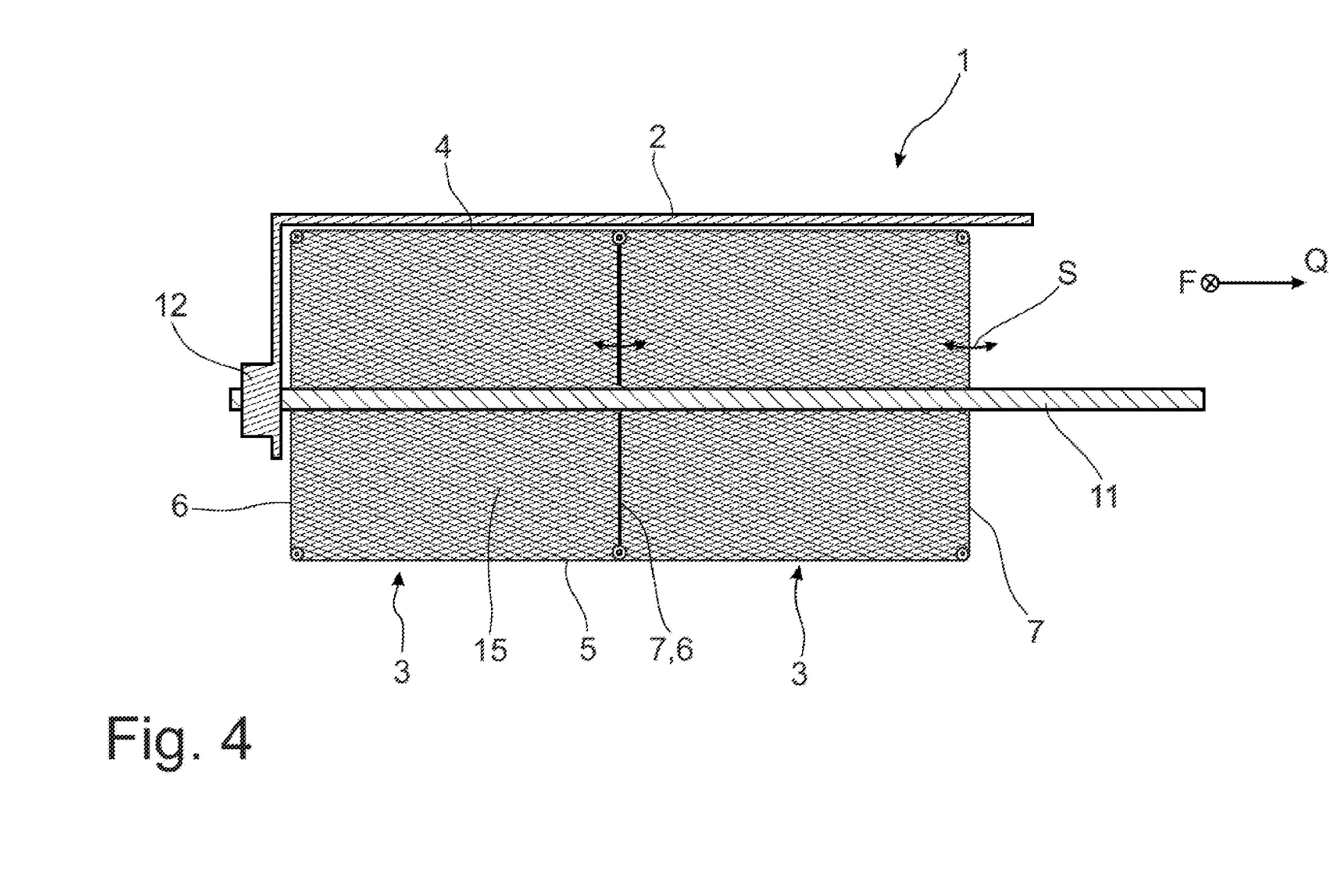
FIG. 4: showing a variant of the thermal insulation device shown in FIG. 3.

FIG. 4 shows the same arrangement as in FIG. 3 in principle. Here, though, as an alternative, two adjoining boxes (thermal insulation elements 3) are separated laterally only by a joint side piece capable of swinging, and thus a connection is formed between the upper sides and lower sides of the adjoining boxes. Here as an alternative, the design of the thermal insulation elements 3 is such that the relatively solid insulating material 15 bears thermal insulation element 3 at the top, for example, and is braced on rod 11.

Figure 5:
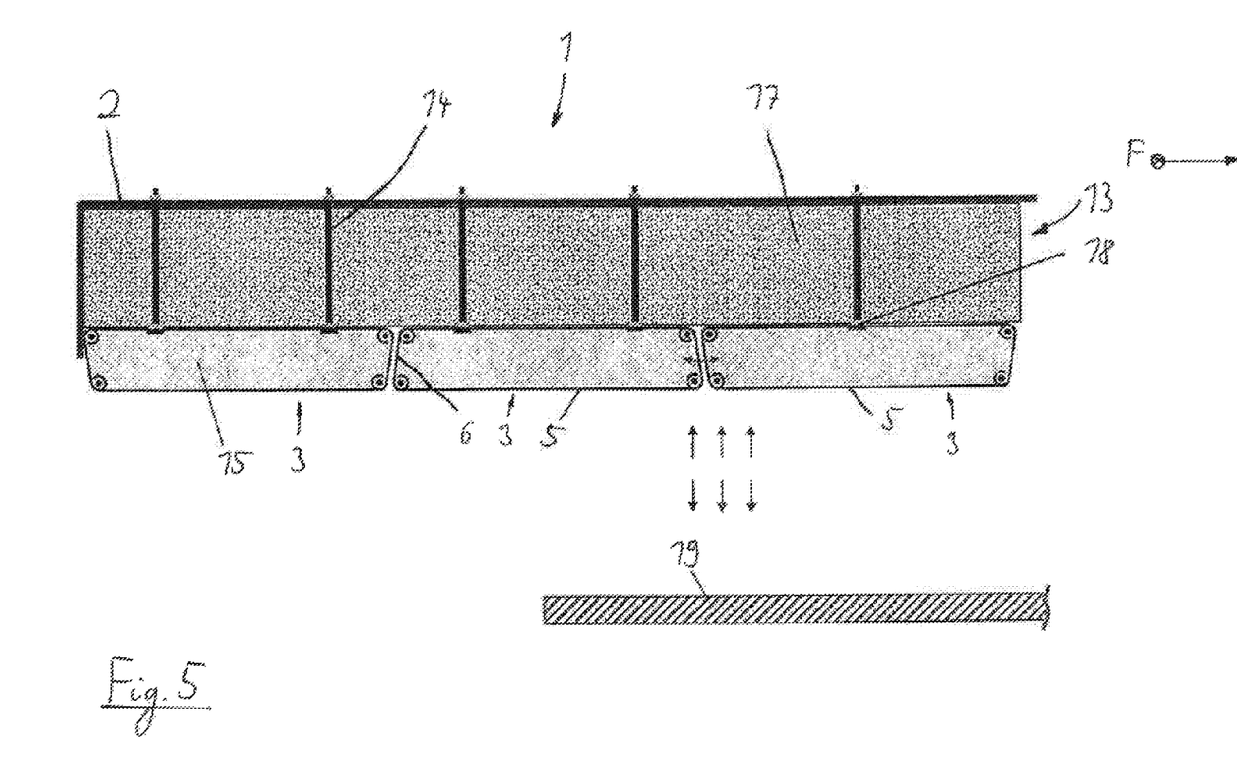
FIG. 5: a schematic view of another variant of the thermal insulation device, viewed in the feed direction of the metallic product to be thermally screened.

FIG. 5 shows a combination of a thermal insulation element 3 with the properties mentioned previously, i.e., consisting of the insulating box (thermal insulation element 3) with high-temperature-resistant membrane plates (side parts) and a flexible swinging attachment of membrane sides as well as a low-temperature insulation 17 (for example, biocompatible ceramic fibers) securely fixed on support element 2. Here the share of expensive, thermally resistant membrane plates 4, 5, 6, 7, 8, 9 and high temperature ceramics is minimized. The individual thermal insulation elements 3 are attached for example by means of spacer bolts 14 or similar connection elements to support element 2 and are individually able to be changed out. The spacer bolts 14 are for example screwed or welded onto the "cold-side plate," see the attachment means 18. The degree of filling of the insulating material is limited so that the swinging motion is not negatively hindered and the metallic membrane facing the belt or slab 19 is subject to a minimum load, or no load at all.

FIG. 5 shows, as an example, thermal insulation elements 3 with trapezoidal contours seen in cross-section.

The structures explained above of the thermal insulation device are described in connection with the thermal insulation of the upper side of the belt or of the slab.

For thermal insulation of the underside of the belt or of the slab, an analogous concept holds true according to the same principles presented.

Figure 6:
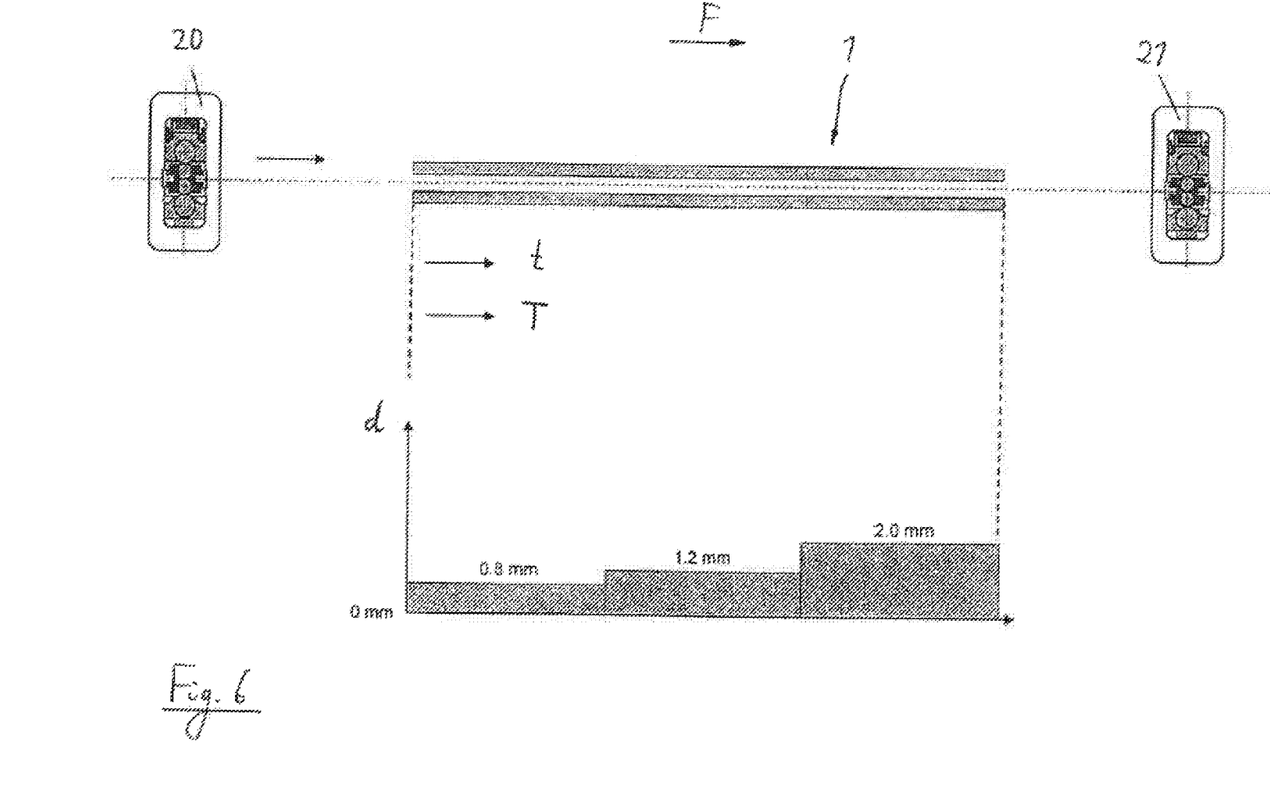
FIG. 6: a schematic view of the configuration of a thermal insulation device, wherein thermal insulation elements are equipped with varying thicknesses of the used plates.

Within a rolling mill, the thermal insulation cover 1 can be designed with varying membrane plate thicknesses d (see FIG. 6). It makes technological sense to design the membranes (side parts) to be thicker when there is greater thermal loading, i.e., surface temperatures of the membrane expected to be higher, or high belt temperature combined with long-duration heating. Conversely, with a relatively short loading time, quick heating of the insulation cover to as high a membrane temperature as possible is desirable. Here a thin membrane should be used. In a special case it is also advantageous to not use a membrane and to use only ceramic fibers. Preferably the membrane thickness is designed to be between 0 and 4 mm.

FIG. 6 shows an embodiment of a sensible choice of different areas for membrane plate thickness d between the preliminary and final path. Shown are the last blooming stand 20 of the preliminary path and the first blooming stand 21 of the final path. Between, a thermal insulation device 1 is placed.

The preliminary strip thus has a relatively long dwell time just before the final path (time t, increasing toward the right); consequently, here a thicker membrane plate (side part) is advantageous. After the preliminary path, the thermal loading (temperature T, increasing toward the right) of the plates is brief; consequently, here a thin membrane plate (side part) is advantageous. In technological terms, the insulation effect can be increased while optimizing maintenance expense.

Instead of using a thin membrane plate or an insulating cover without a membrane plate, also a specular reflection insulating cover (here the thermal radiation is reflected and the insulating effect acts directly) with insulating elements with membrane plates having greater plate thickness can be advantageously combined within an installation.

Naturally, the described design is not limited to the application example of FIG. 6, but is also able to be transferred to other designs of installations as well as to other aggregates (framework, shearing device, etc.) between the various types of insulation covers or membrane plate thicknesses.

Figure 7A:
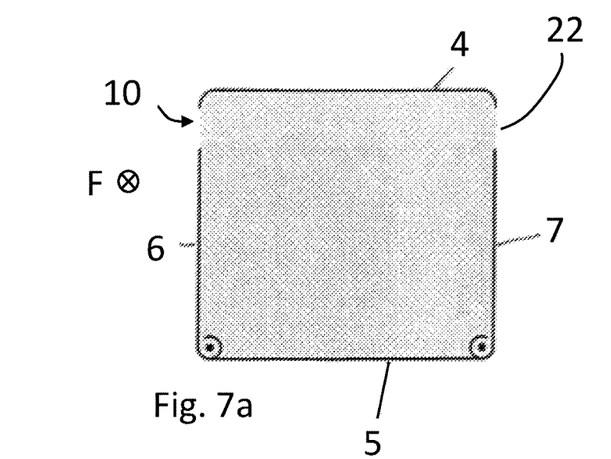
FIG. 7*a*: a thermal insulation element viewed in the feed direction as per another embodiment of the invention.
Figure 7B:
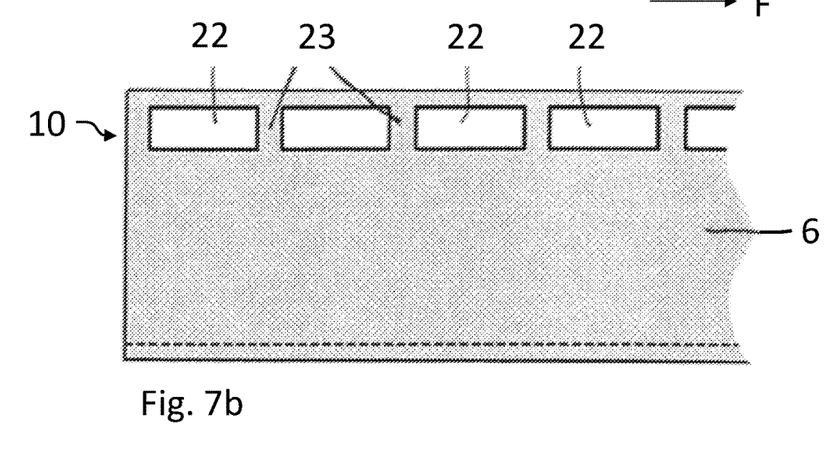
FIG. 7*b*: the side view of the thermal insulation element shown in FIG. 7*a*.
Figure 8A:
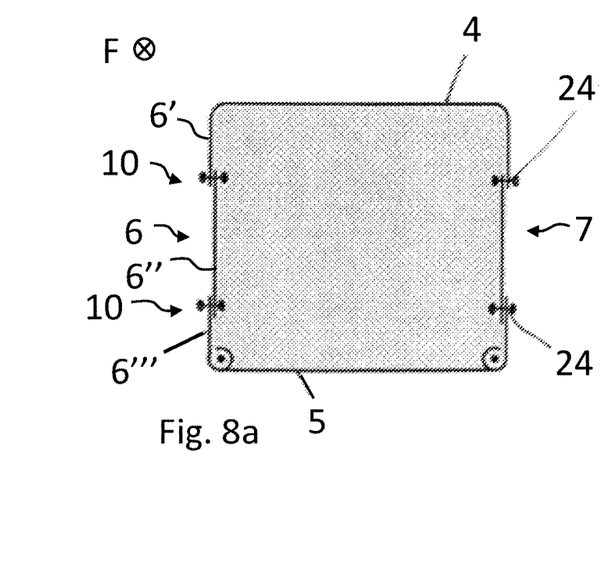
FIG. 8*a*: a thermal insulation element viewed in the feed direction as per another embodiment of the invention.
Figure 8B:
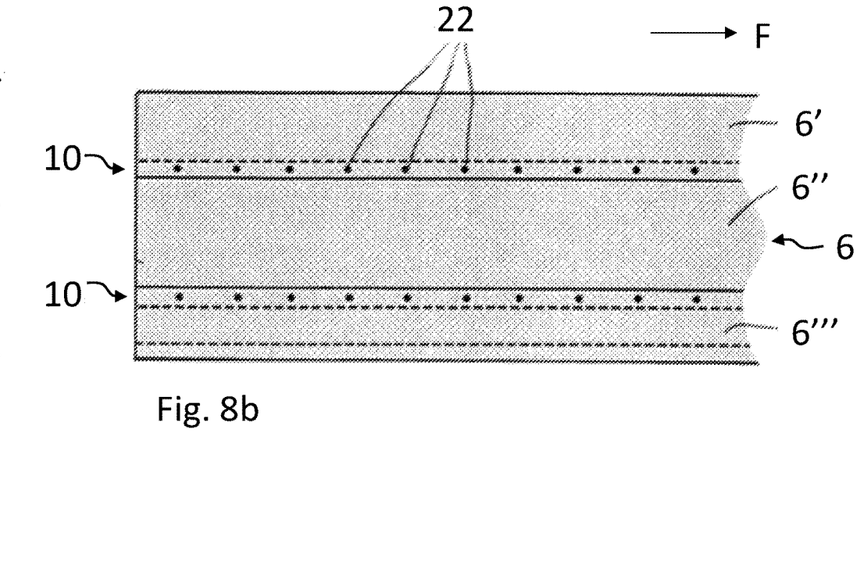
FIG. 8*b*: the side view of the thermal insulation element shown in FIG. 8*a*.

FIGS. 7 and 8 show two additional embodiments of the invention, from which it is seen how the hinge-like connection 10 can be produced.

For this it is seen in FIG. 7 that in the two side parts 6 and 7, in their upper area, recesses 22 are created (stamped in, for example), which are so manufactured that between two recesses 22 only a thin strip 23 remains. In the area of the transition of side part 6 to side part 4, or from side part 7 to side part 4, consequently a hinge-like function is created in the basin area.

A hinge-like connection 10 can also be attained by weakening of the longitudinal side plates of thermal insulation element 3 by creating the said recesses or blanks 22. Through this, the longitudinal side plate is bendable with mild elasticity, and acts—related to the conditions on the hot side—like a hinge.

Another possible solution is shown in FIG. 8. Here, side parts 6 and 7 are not configured as continuous plates, but rather they both consist of 3 side part sections 6', 6" and 6'" (side part 7 is also analogous). The connections 24 between the individual side part sections, which can be configured to be relatively loose, thus create a mechanical weakening and the desired hinge effect.

Also able to be provided is a side part section 6", which is configured as a thin intermediate plate (for example with a thickness of 0.5 mm, while the other side parts have a thickness of 1.5 mm, for example), which likewise acts with bending elasticity. The intermediate plates 6" can deliberately be attached in loose fashion (with play in connection element 24), by which alternatively, or in supplemental fashion, the desired mobility becomes possible and thus the hinge effect is produced. If one combines the above-mentioned measures, the effect equivalent to a hinge is correspondingly amplified.

Through the additional installation of the preferably substantially thinner, and thus more bending-elastic intermediate plate 6" on the longitudinal side (with a plate thickness markedly thinner than that of the adjoining side parts), a comparable effect can thus be generated.

The connection elements 24 in FIG. 8 can, as mentioned, be deliberately configured or installed to be loose, so that in addition, or alternatively, a possibility for motion is produced.

The above-mentioned measures for producing a hinge effect can also be combined, so that the effect equivalent to a hinge is further amplified.

LIST OF REFERENCE SYMBOLS

1 Thermal insulation device
2 Support element
3 Thermal insulation element
4 Side part
5 Side part
6 Side part
6' Side part section
6" Side part section
6'" Side part section
7 Side part
8 Side part
9 Side part
10 hinge-like connection
10' hinge
10" spiral-shaped wire
11 rod
12 Attachment element (screw)
13 gap
14 spacer bolt
15 insulation material (ceramic fibers)
16 stretch joint
17 low temperature insulation
18 Attachment means (screwing or welding)
19 thermal belt or slab
20 last blooming stand
21 first final-path blooming stand
22 recess
23 strip
24 connection
B Width of thermal insulation element in transverse direction Q
$L_S$ hinge partial length
$D_S$ hinge diameter
F feed device
Q horizontal direction transverse to feed direction
S pivoting motion
d membrane plate thickness

The invention claimed is:
1. A thermal insulation device for thermal insulation of a metallic product in a rolling mill, comprising:
   a support element;
   at least one thermal insulation element; and
   a thermal insulation material;
   wherein each of the at least one thermal insulation elements are formed by multiple side parts which circumferentially enclose an accommodating space configured to hold the thermal insulation material,
   wherein at least two of the side parts are connected to each other along adjoining sides by a connection adapted for pivoting the at least two side parts relative to each other, and
   wherein the support element is configured to suspend and arrangement of the at least one thermal insulation element above the metallic product in the rolling mill.
2. The thermal insulation device of claim 1, characterized in that the connection is formed by a number of hinges, which are arranged along the adjoining side areas.
3. The thermal insulation device of claim 2, characterized in that each of the number of hinges is defined by a length and a diameter, with the length being at most 10 times the diameter.
4. The thermal insulation device of claim 1, characterized in that the connection is formed by at least one spiral-shaped wire, which is threaded into boreholes that are made along the adjoining side areas.
5. The thermal insulation device of claim 1, characterized in that the connection is formed by an at least sectional weakening of a mechanical strength, of at least one of the at least two side parts.
6. The thermal insulation device of claim 5, characterized in that the at least one of the at least two side parts is a longitudinal plate extending along a longitudinal extent of the thermal insulation device, wherein the weakening is produced by at least one recess in the at least one of the longitudinal plates.
7. The thermal insulation device of claim 5, characterized in that the at least one of the at least two side parts is a longitudinal plate extending along a longitudinal extent of the thermal insulation device, wherein the weakening results from the at least one of the longitudinal plates being assembled from at least two separate side piece sections connected with each other.
8. The thermal insulation device of claim 1, characterized in that the side parts are formed by metal plates.
9. The thermal insulation device of claim 1, characterized in that the thermal insulation material is formed at least in part by ceramic fibers.
10. The thermal insulation device of claim 1, characterized in that a plurality of the number of thermal insulation elements are arranged both in a direction transverse to a feed direction of the metallic product and also in the feed direction of the metallic product.
11. The thermal insulation device of claim 1, characterized in that at least one of the thermal insulation elements viewed in a feed direction of the metallic product, has a square, rectangular or trapezoidal shape.
12. The thermal insulation device of claim 1, characterized in that the multiple thermal insulation elements are arranged next to each other in a direction transverse to a feed direction of the metallic product, wherein at least two adjoining ones of the multiple thermal insulation elements have a joint side part.
13. The thermal insulation device of claim 1, characterized in that the multiple thermal insulation elements are arranged in a direction transverse to a feed direction of the metallic product and are penetrated by at least one rod.
14. The thermal insulation device of claim 13, characterized in that the at least one rod penetrates lateral sections of the support element extending in a vertical direction, and is secured on the support element by attachment elements.
15. The thermal insulation device of claim 14, wherein the attachment elements are bolts.
16. The thermal insulation device of claim 1, characterized in that a gap is present in a vertical direction between the number of thermal insulation elements and the support element.
17. The thermal insulation device of claim 16, characterized in that the gap is at least partially filled with insulating wool.
18. The thermal insulation device of claim 17, characterized in that when the-insulating wool is placed in the gap, an extension of the gap in the vertical direction at most is 100 mm.
19. The thermal insulation device of claim 16, characterized in that the gap is penetrated in the vertical direction by a number of connection elements, which are attached on the support element and on the thermal insulation elements.
20. The thermal insulation device of claim 19, wherein the connection elements are spacer bolts.
21. The thermal insulation device of claim 16, wherein the gap has a width of at most 30 mm.
22. The thermal insulation device of claim 16, wherein the gap is at least partially filled with biocompatible ceramic fibers.
23. The thermal insulation device of claim 1, characterized in that a plate thickness of the side parts differs at least in part.
24. The thermal insulation device of claim 23, wherein the side parts comprise first side parts extending in a feed direction of the metallic product and second side parts extending perpendicular to the feed direction, and wherein the first side parts are thicker than the second side parts.
25. The thermal insulation device of claim 1, characterized in that the number of thermal insulation elements in a direction transverse to a feed direction of the metallic product at least in part differ in width.
26. The thermal insulation device of claim 1, characterized in that in a feed direction of the metallic product at least two of the number of thermal insulation elements are arranged to follow each other, wherein the two thermal insulation elements following each other in the feed direction have corresponding side parts that are configured to be different in thickness.
27. The thermal insulation device of claim 1, wherein the connection is formed by an at least sectional weakening of a flexural strength of at least one of the at least two side parts.

* * * * *